United States Patent
Roberts

(10) Patent No.: US 7,653,390 B2
(45) Date of Patent: *Jan. 26, 2010

(54) APPARATUS AND METHOD FOR MAKING MEASUREMENTS IN UNIVERSAL MOBILE TELECOMMUNICATIONS SYSTEM USER EQUIPMENT

(75) Inventor: Gideon Roberts, Stone (GB)

(73) Assignee: M-Stack Limited, Birmingham (GB)

( * ) Notice: Subject to any disclaimer, the term of this patent is extended or adjusted under 35 U.S.C. 154(b) by 152 days.

This patent is subject to a terminal disclaimer.

(21) Appl. No.: 11/557,205

(22) Filed: Nov. 7, 2006

(65) Prior Publication Data

US 2007/0066301 A1  Mar. 22, 2007

Related U.S. Application Data

(63) Continuation of application No. 10/775,029, filed on Feb. 9, 2004, now Pat. No. 7,151,930.

(51) Int. Cl.
*H04W 4/00* (2009.01)

(52) U.S. Cl. ............ 455/434; 455/432.3; 455/513
(58) Field of Classification Search ............ 455/434, 455/432.3, 435.2, 435.3, 436, 437, 552.1, 455/550.1, 512, 513, 525, 168.1, 127.4
See application file for complete search history.

(56) References Cited

U.S. PATENT DOCUMENTS 6,400,951 B1 *  6/2002  Vaara ............... 455/436
2005/0079870 A1 *  4/2005  Rick et al. ......... 455/437

* cited by examiner

*Primary Examiner*—Jean A Gelin

(57) ABSTRACT

A method and apparatus for taking measurements in a mobile telecommunications system is disclosed, the system comprising a network of a plurality of cells and at least one user equipment device. The user equipment device scans frequency bands to generate measurement data for signals received from cells of the network; and when the signals received from cells of the network include more than one signal in a frequency band, measurement data is generated for more than one signal in the frequency band.

7 Claims, 7 Drawing Sheets

APPARATUS AND METHOD FOR MAKING MEASUREMENTS IN UNIVERSAL MOBILE TELECOMMUNICATIONS SYSTEM USER EQUIPMENT

BACKGROUND

1. Technical Field

This application relates to UMTS (Universal Mobile Telecommunications System) in general, and to an apparatus and method for making measurements in universal mobile telecommunications system user equipment.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.13.0, referred to herein as the 25.331 specification, addresses the subject of the Radio Resource Control (RRC) protocol specification. The 3GPP 25.304 specification, v.3.13.0, referred to herein as the 25.304 specification, addresses the subject of UMTS User Equipment (UE) procedures in idle mode and procedures for cell reselection in connected mode between the UMTS Terrestrial Radio Access Network (UTRAN) and the UE.

Such a UE undertakes frequent measurement procedures. Clause 8.4 of the 25.331 standard and its sub-clauses and clause 14 and its sub-clauses relate to the measurement procedures to be undertaken by the UE as do clause 5 and its sub-clauses of the 25.304 specification. Both the 25.331 standard (and in particular clauses Clause 8.4 and its sub-clauses and clause 14 and its sub-clauses) and the 25.304 standard (and in particular clauses 5.2.3.1 and its sub-clauses) are incorporated herein by reference.

In accordance with clause 5.2.3.1.1 of the 25.304 specification, the UE shall use one of the following two search procedures:

a) Initial Cell Selection

This procedure requires no prior knowledge of which RF channels are UTRA carriers. The UE shall scan all RF channels in the UTRA bands according to its capabilities to find a suitable cell of the selected Public Land Mobile Network (PLMN). On each carrier, the UE need only search for the strongest cell. Once a suitable cell is found this cell shall be selected.

b) Stored Information Cell Selection

This procedure requires stored information of carrier frequencies and optionally also information on cell parameters, e.g. scrambling codes, from previously received measurement control information elements. Once the UE has found a suitable cell for the selected network the UE shall select it. If no suitable cell of the selected network is found, the Initial Cell Selection procedure shall be started.

However the initial cell procedure as set out in a) above requires that the UE only searches for the strongest cell for each carrier (i.e. frequency or frequency band). The UE then attempts to connect with the selected cell. If there is any problem with doing so, the UE then tries the cell which had the next strongest signal at another frequency. However this may not in reality be the next strongest signal.

There are thus proposed strategies for User Equipment (UE) measurement procedures, which are appropriate in idle mode and during cell selection in connected mode. A number of such strategies are detailed below.

Other aspects and features of the present invention will become apparent to those ordinarily skilled in the art upon review of the following description of specific embodiments of an apparatus and method for carrying out User Equipment (UE) procedures in idle mode and procedures for cell reselection in connected mode.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for making measurements in mobile telecommunications system user equipment is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for taking measurements in a mobile telecommunications system, the system comprising a network of a plurality of cells and at least one user equipment device. The method comprises, at the user equipment device, scanning frequency bands to generate measurement data for signals received from cells of the network. When the signals received from cells of the network include more than one signal in a frequency band, measurement data is generated for more than one signal in the frequency band.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
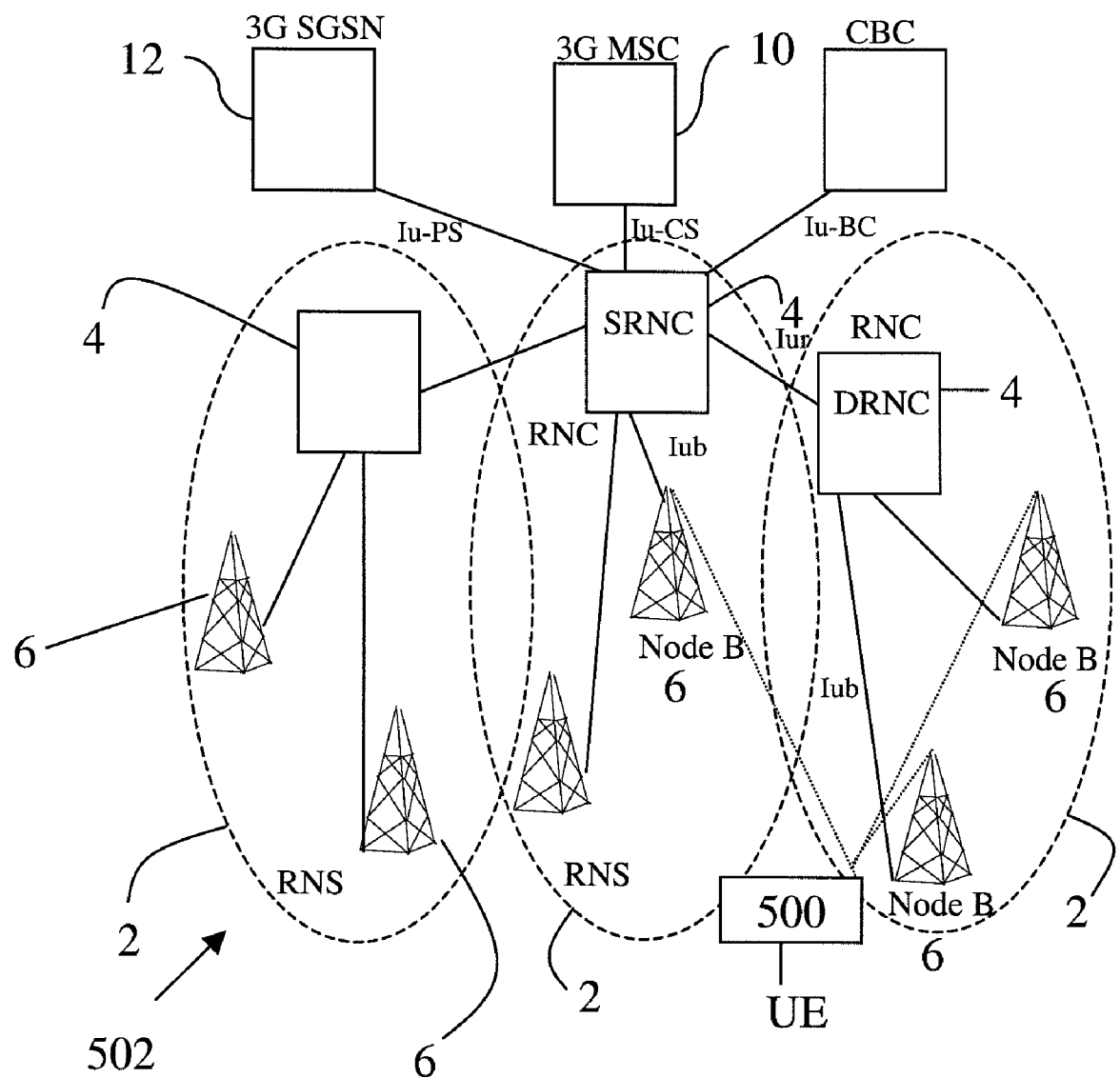
FIG. 1 shows an overview of a network and UE device.

FIG. 1 shows an overview of a network and a UE device. Clearly in practice there may be many UE devices operating with the network but, for the sake of simplicity, FIG. 1 only shows a single UE device. For the purposes of illustration, FIG. 1 also shows a network having a few components. It will be clear to a person skilled in the art that in practice a network will include far more components than those shown.

FIG. 1 shows an overview of the radio access network 702 (UTRAN) used in a UMTS system. The network 702 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 700 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also be connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

According to section 5.2.3.1.2 of the 25.304 standard, the cell selection criterion S is fulfilled when Srxlev>0 and Squal>0 (for FDD Mode) or Srxlev>0 (for TDD mode).

Squal is the Cell Selection quality value (dB) (applicable only for FDD cells) and Srxlev is the Cell Selection receive level value (dB)

Where

Srxlev=Qrxlevmeas−Qrxlevmin−Pcompensation

Squal=Qqualmeas−Qqualmin (FDD mode only) and

Qrxlevmeas is the Measured cell receive level value. This is received signal, CPICH RSCP for FDD cells (dBm) and P-CCPCH RSCP for TDD cells (dBm).

Qrxlevmin is the Minimum required RX level in the cell (dBm)

Pcompensation is equal to max(UE_TXPWR_MAX_RACH−P_MAX, 0) (dB)

UE_TXPWR_MAX_RACH is the Maximum transmission power level an UE may use when accessing the cell on RACH (read in system information) (dBm)

P_MAX is the Maximum RF output power of the UE (dBm)

Qqualmeas is the Measured cell quality value i.e. the quality of the received signal expressed in CPICH Ec/N0 (dB) (applicable only for FDD cells).

Qqualmin is the Minimum required quality level in the cell (dB) (applicable only for FDD cells).

In the following description, the FDD mode will be considered. However the technique is also applicable in the TDD mode.

The UE occasionally carries out measurements of Srxlev and Squal. The UE scans all RF channels in the UTRA bands applicable for the device to find a suitable cell of the selected network. The UE will typically perform these cell selection measurements on power-up or if trying to find a cell when in a region with limited coverage (e.g. when in a remote area or a tunnel). Specifically the UE performs cell selection measurements when it is currently not camped on a cell.

Figure 2:
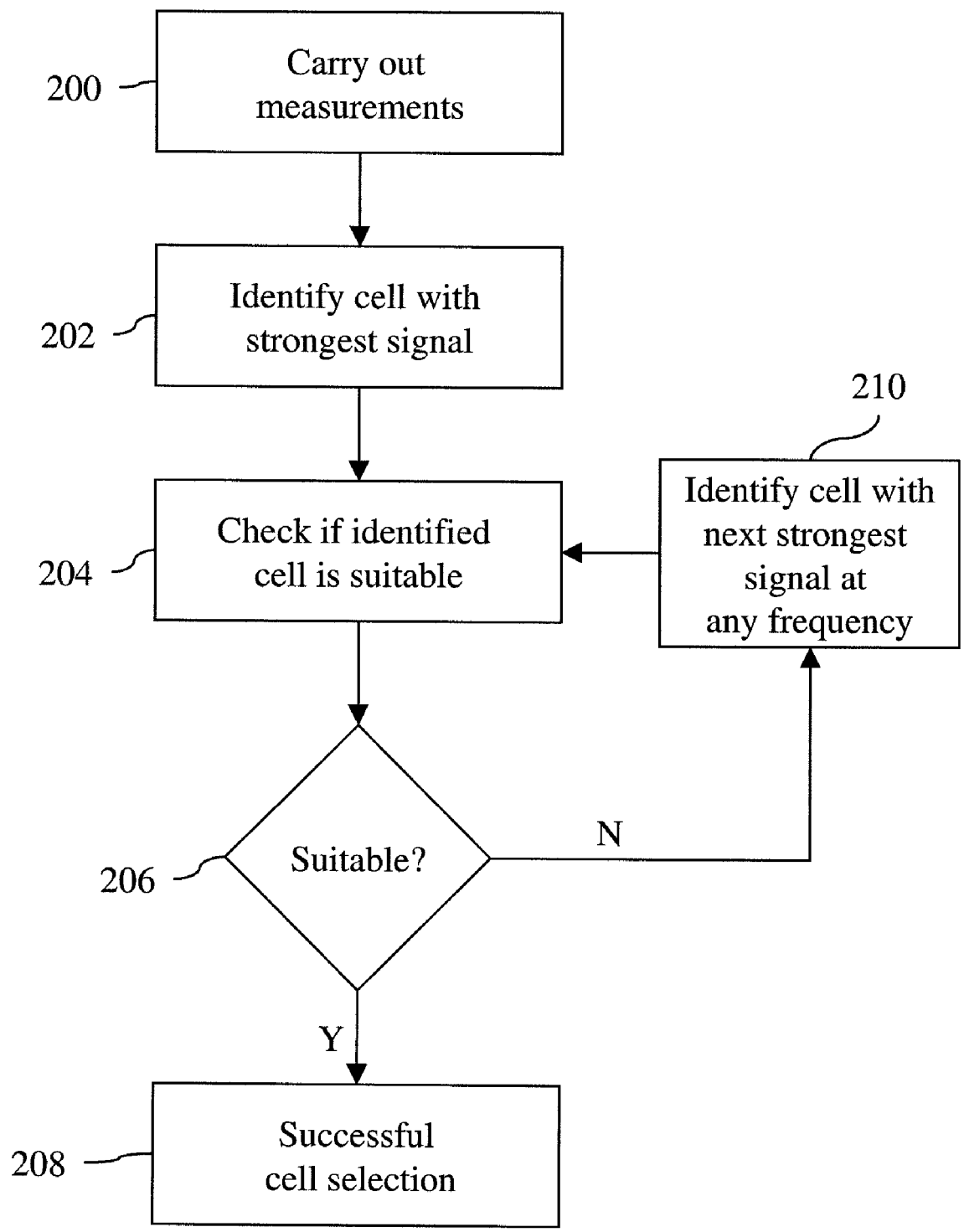
FIG. 2 is a flow diagram illustrating a first embodiment.

In a first embodiment, the UE is arranged during cell selection to search for more than one cell per frequency. This is illustrated in FIG. 2 which is a flow chart illustrating the operation of a UE device. At intervals the UE device carries out measurements, step 200. The UE carries out measurements on all frequencies according to its capability for all cells within range. In this embodiment, the UE is arranged to generate measurement data for more than one signal in a frequency band of interest. Thus, when signals received from cells of the network include more than one signal in a frequency band of interest, the UE generates measurement data for each signal of the plurality of signals in the frequency band.

The UE then determines whether the measurement data meets a predetermined criterion and stores the measurement data in an order relative to the meeting of the criterion. An example of a suitable criterion is signal strength or Srxlev/Squal as discussed above.

Table 1 shows an example of the signal measurement results for a UE, with the strongest signals being shown at the top of the table and the weakest signals shown at the bottom.

TABLE 1

| | |
|---|---|
| $C_A$ | $f_1$ |
| $C_D$ | $f_1$ |
| $C_B$ | $f_2$ |
| $C_E$ | $f_1$ |
| $C_F$ | $f_3$ |
| $C_G$ | $f_4$ |
| $C_H$ | $f_3$ |
| $C_C$ | $f_5$ |
| $C_I$ | $f_6$ |
| $C_J$ | $f_6$ | where $C_A$ indicates a signal from cell A and $f_1$ indicates a signal at frequency $f_1$.

The UE uses these measurement results to identify the cell with the strongest signal, step 202. In the example shown in table 1 this is the signal from cell A at frequency $f_1$. The UE then checks whether the identified cell at the identified frequency is suitable, step 204. If the identified cell at the identified frequency is suitable, step 206, successful cell selection has occurred, step 208, and the UE continues operation. However the identified cell may not be suitable. For example, if the system information from a cell which informs the UE how to connect to the cell has an error in it, then the cell is deemed to be unsuitable. For other examples, Clause 4.3 of the 25.304 standard sets out various basis on which a UE can decide if a cell is suitable.

However if the identified cell is not suitable at step 206, the UE then identifies the cell with the next strongest signal, step 210. The UE identifies from the stored measurement data the cell with the next strongest signal at any frequency. In the example shown in table 1, this is cell D at a frequency $f_1$, i.e., a different cell operating at the same frequency as the previously identified cell. The UE then attempts to connect with this identified cell at step 204 and if successful a successful cell connection with cell D at frequency $f_1$ is made. Otherwise the UE continues to identify cells with the next strongest signal and to attempt to connect with these cells until a successful connection is made or connection to all potential cells has failed, in which case the UE returns a message to the user, for instance "emergency calls only" or "no network coverage". The UE then periodically repeats the search for a suitable cell.

Thus, rather than searching for just the strongest cell on each carrier, the UE may search for more than one cell per frequency. If the strongest cell is then found to be unavailable for any reason, the next best cell can be used without the need for another cell search to be performed. This process is also applicable for scans where the UE carries out stored information cell selection (b of Clause 5.2.3.1.1 of the 25.304 standard).

In an alternative embodiment, when an identified cell is deemed unsuitable, the scanning step is re-initiated with the omission from the scan of the cell or the frequency of the cell previously identified as the cell which best meets a cell selection criterion.

Figure 3:
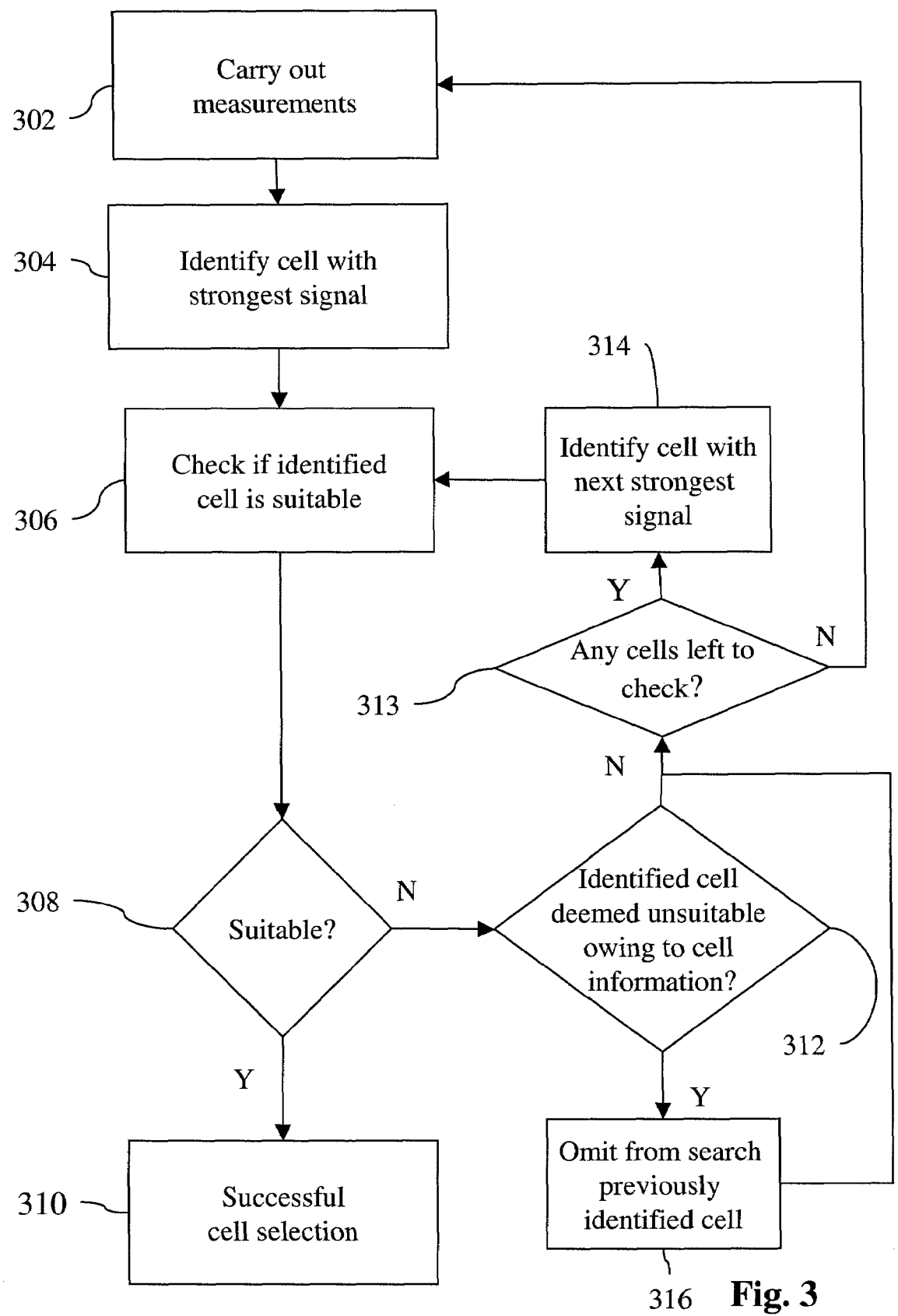
FIG. 3 is a flow diagram illustrating a second embodiment.

FIG. 3 shows a second embodiment of the technique. In this embodiment, the UE carries out measurements to search for the strongest cell on each carrier required according to its capabilities, step 302. An example of the measurements made by a UE is shown in table 2, with the strongest signals being shown at the top of the table and the weakest signals shown at the bottom.

TABLE 2

| | |
|---|---|
| $C_A$ | $f_1$ |
| $C_B$ | $f_2$ |
| $C_F$ | $f_3$ |
| $C_G$ | $f_4$ |
| $C_C$ | $f_5$ |
| $C_I$ | $f_6$ |

The UE then identifies the cell with the strongest signal, step 304. For the results shown in table 2, this is cell A at frequency $f_1$. The UE then checks if this identified cell is suitable, step 306. If so, step 308, a successful cell selection is made, step 410. However, if the cell is not suitable because it is barred for any reason (e.g. it is not suitable owing to cell information (for example because the cell is not on the same public land mobile network (PLMN) as that selected by the UE)), step 312, and there are cells left to check, step 413, the UE then identifies the cell on the next strongest frequency, (frequency $f_2$, cell B), step 414, and checks if this is a suitable cell, step 406. If at step 412 an identified cell is unsuitable for reasons owing to cell information (e.g. for being from a different PLMN), the UE excludes from the next measurement scan the previously identified cell (frequency $f_1$, cell A), step 316. The UE then initiates a new cell search, step 302. The UE may check the remaining identified cells for suitability (step 313) before starting the new cell search. If a suitable cell is found then the new cell search is not required. The UE may optimise the new cell search to include only the frequency of the excluded cell (frequency $f_1$) since Cell A is known to be from the same PLMN as that selected by the UE. This means that the UE only has to carry out a scan for an alternative signal at the required frequency ($f_1$) rather than carrying out a full scan at all frequencies. The results of this are shown in table 3.

TABLE 3

| | |
|---|---|
| $C_D$ | $f_1$ |
| $C_B$ | $f_2$ |
| $C_F$ | $f_3$ |
| $C_G$ | $f_4$ |
| $C_C$ | $f_5$ |
| $C_I$ | $f_6$ |

The UE has therefore excluded from the cell search scan any signals from the cell which was previously deemed unsuitable i.e cell A.

The UE then identifies from this second scan the cell with the strongest signal, step 304. For the example results shown in table 3, this is cell D, frequency $f_1$. The UE then checks if this identified cell is suitable, step 306, and if so, step 308, a successful cell selection is made, step 310. Otherwise the UE initiates another cell search with cell D excluded from the scan. This continues until a suitable cell is identified or connection to all potential cells has failed, in which case the UE returns a message to the user, for instance "emergency calls only" or "no network coverage". The UE then periodically repeats the search for a suitable cell.

Thus, when the strongest cell on a particular frequency is unsuitable, a new cell search (initial cell selection or stored information cell selection) is started with the strongest cell specifically excluded from the search. This means that the next strongest cell on that frequency may be returned by the cell search procedure.

Figure 4:
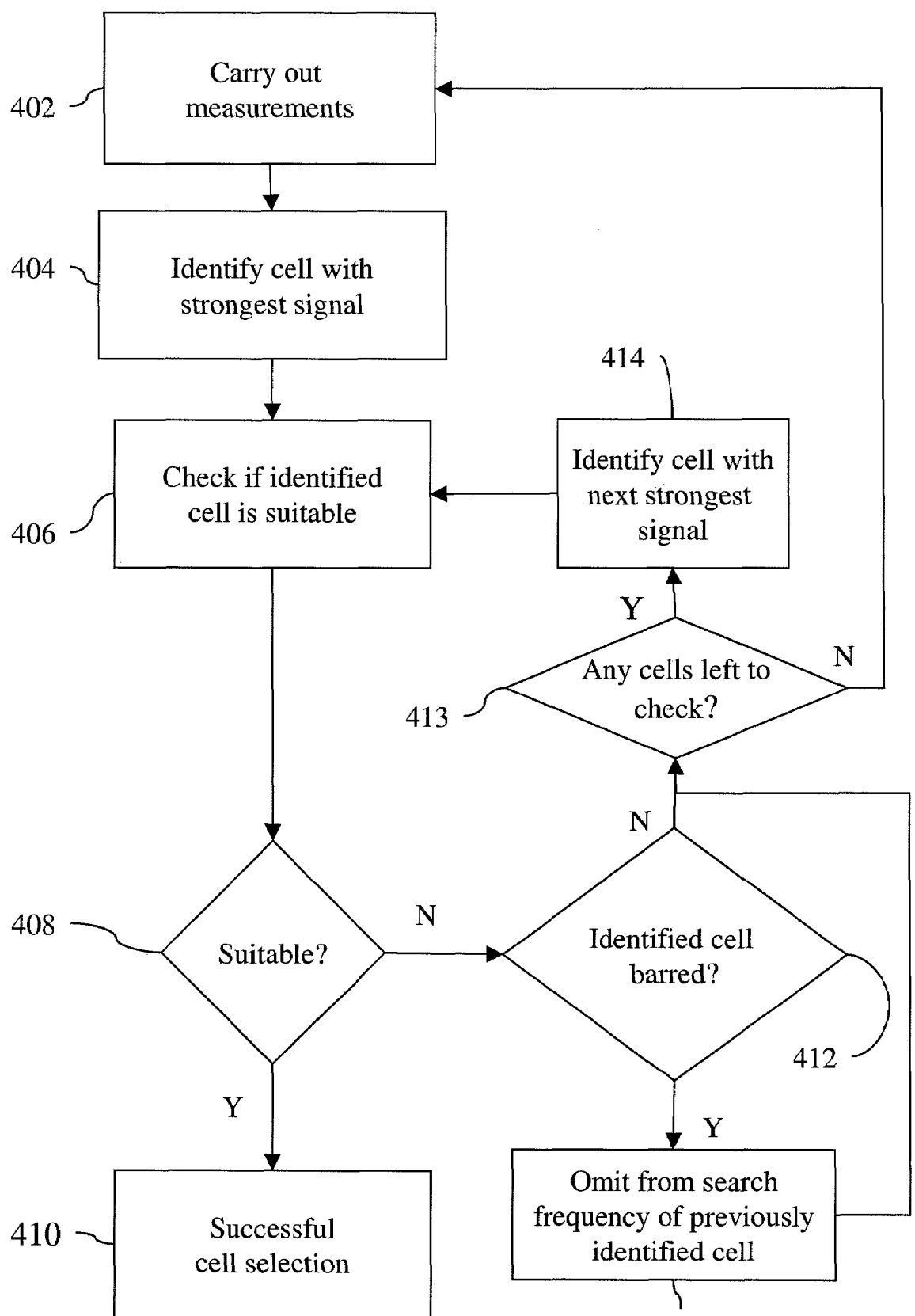
FIG. 4 is a flow diagram illustrating a third embodiment.

FIG. 4 shows a third embodiment of the technique. In this embodiment, when no identified cells are deemed suitable by the UE, the scanning step is re-initiated with certain frequencies omitted from the scan (for example, frequencies which the UE is not allowed to use). In the case as discussed above, this means that the scan will omit the frequency of the cell previously identified as the cell which best meets a cell selection criterion. This means that the UE does not use up processing time to generate measurement data for signals at a frequency that has already been deemed unsuitable. Where the system information for a cell indicates that the cell is unsuitable (for example SIB3 for a cell indicates that the cell is "barred" and the Information Element "Intra-frequency cell-reselection indicator" is set to "not allowed"), the UE is not allowed to select this cell or a cell on the same frequency (see 25.304 clause 5.3.1.1). The approach described with reference to FIG. 4 means that the UE will not generate measurement data for that frequency in a subsequent search and thus other (less strong) frequencies may be measured by the UE.

Thus, as shown in FIG. 4, at step 408, if a cell is deemed unsuitable and, at step 412 the cell is deemed unsuitable owing to cell information, (for instance, the cell is indicated as "barred" with the IE "Intra-frequency cell-reselection indicator" set to "not allowed"), then the UE omits that frequency from the next cell search, step 416, if one is required. If there are cells which have yet to be checked, step 413, then the UE continues the process with the next strongest cell, step 414. If all cells have been checked, and none found to be suitable, the UE starts a new cell search with any unsuitable frequencies omitted. This continues until a suitable cell is identified or connection to all potential cells has failed, in which case the UE returns a message to the user, for instance "emergency calls only" or "no network coverage". The UE then periodically repeats the search for a suitable cell.

As an illustration, an example of the initial measurement results obtained at step 402 is shown in Table 4:

TABLE 4

| | |
|---|---|
| $C_D$ | $f_1$ |
| $C_B$ | $f_2$ |
| $C_F$ | $f_3$ |
| $C_G$ | $f_4$ |
| $C_C$ | $f_5$ |
| $C_I$ | $f_6$ |

For example, if cell B and cell G are found to be "barred" with the IE "Intra-frequency cell-reselection indicator" set to "not allowed", and none of the other cells are suitable, the UE will perform another cell search with frequencies $f_2$ and $f_4$ omitted. The results for the second cell search may now include cells from frequencies not reported previously due to constraints on the number of reported cells in the measurement data, see Table 5.

TABLE 5

| | |
|---|---|
| $C_D$ | $f_1$ |
| $C_F$ | $f_3$ |
| $C_C$ | $f_5$ |
| $C_I$ | $f_6$ |
| $C_J$ | $f_7$ |
| $C_K$ | $f_8$ |

The UE may scan all RF bands used by the network or the UE may scan only the RF bands known to be of interest to the UE (as indicated in previously stored information).

Figure 5:
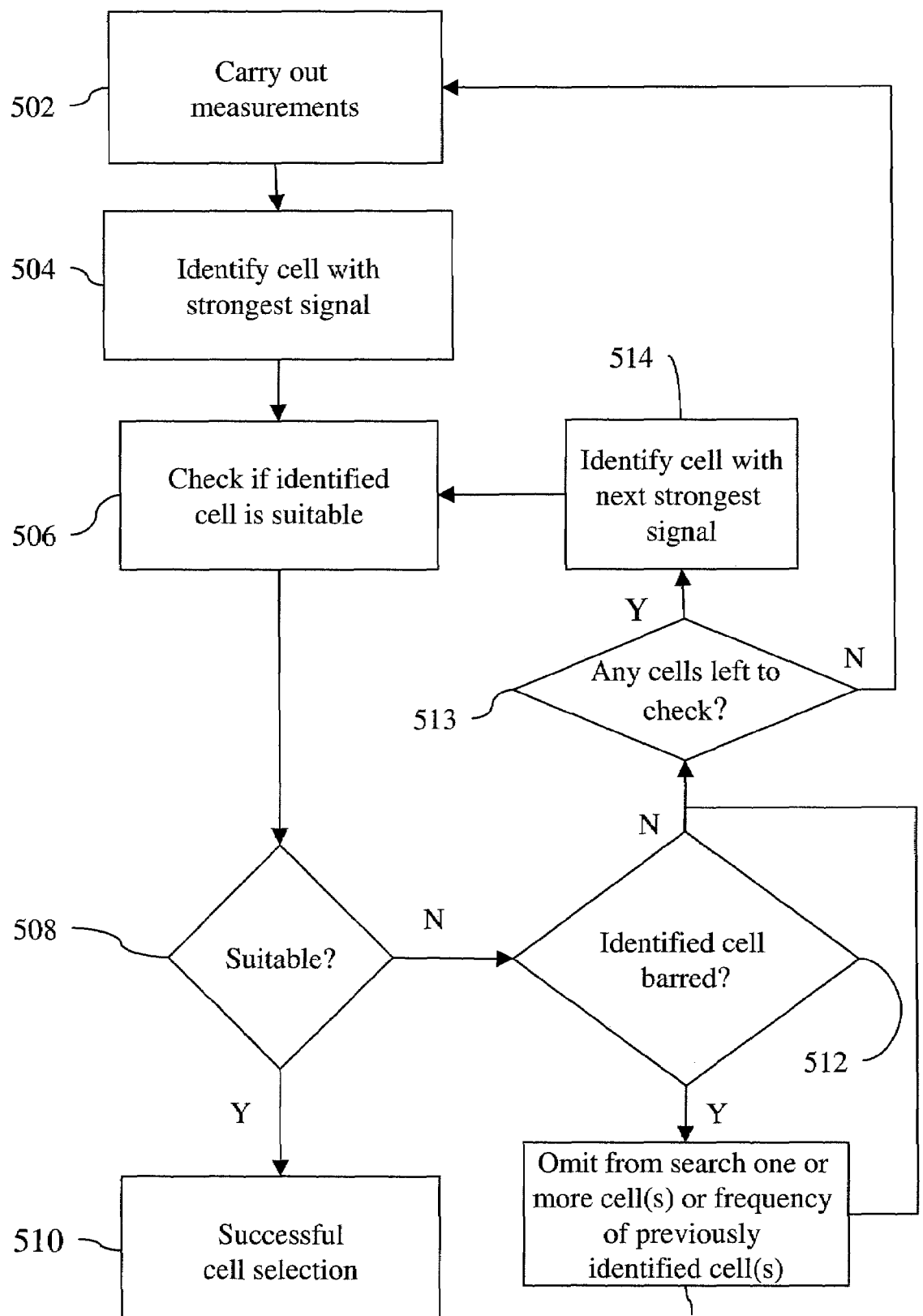
FIG. 5 is a flow diagram illustrating a fourth embodiment.

FIG. 5 is a flow diagram illustrating a combination of these approaches in which, at step 516, a further scan by the UE omits from the scan any previously identified cell(s) or the frequency of any previously identified cell(s).

Figure 6:
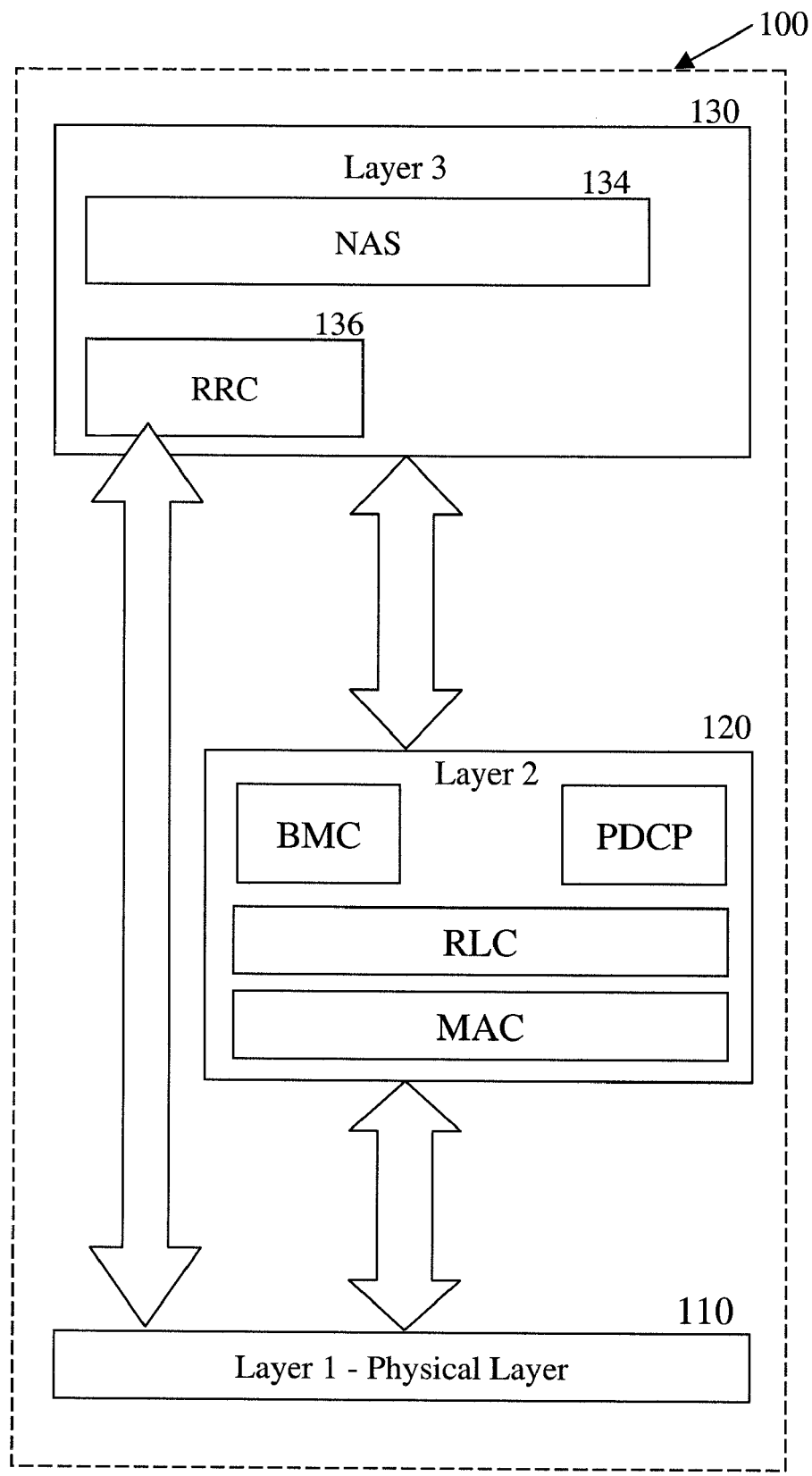
FIG. 6 is a block diagram illustrating an embodiment of a protocol stack apparatus provided with a RRC block, in accordance with the present application.

Referring to the drawings, FIG. 6 is a block diagram illustrating an embodiment of a UMTS protocol stack apparatus.

The RRC block 136 a sub layer of Layer 3 130 of a UMTS protocol stack 100. The RRC 136 exists in the control plane only and provides an information transfer service to the non-access stratum NAS 134. The RRC 136 is responsible for controlling the configuration of radio interface Layer 1 110 and Layer 2 120. When the UTRAN wishes to change the UE configuration it will issue a message to the UE containing a command to invoke a specific RRC procedure. The RRC 136 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

Figure 7:
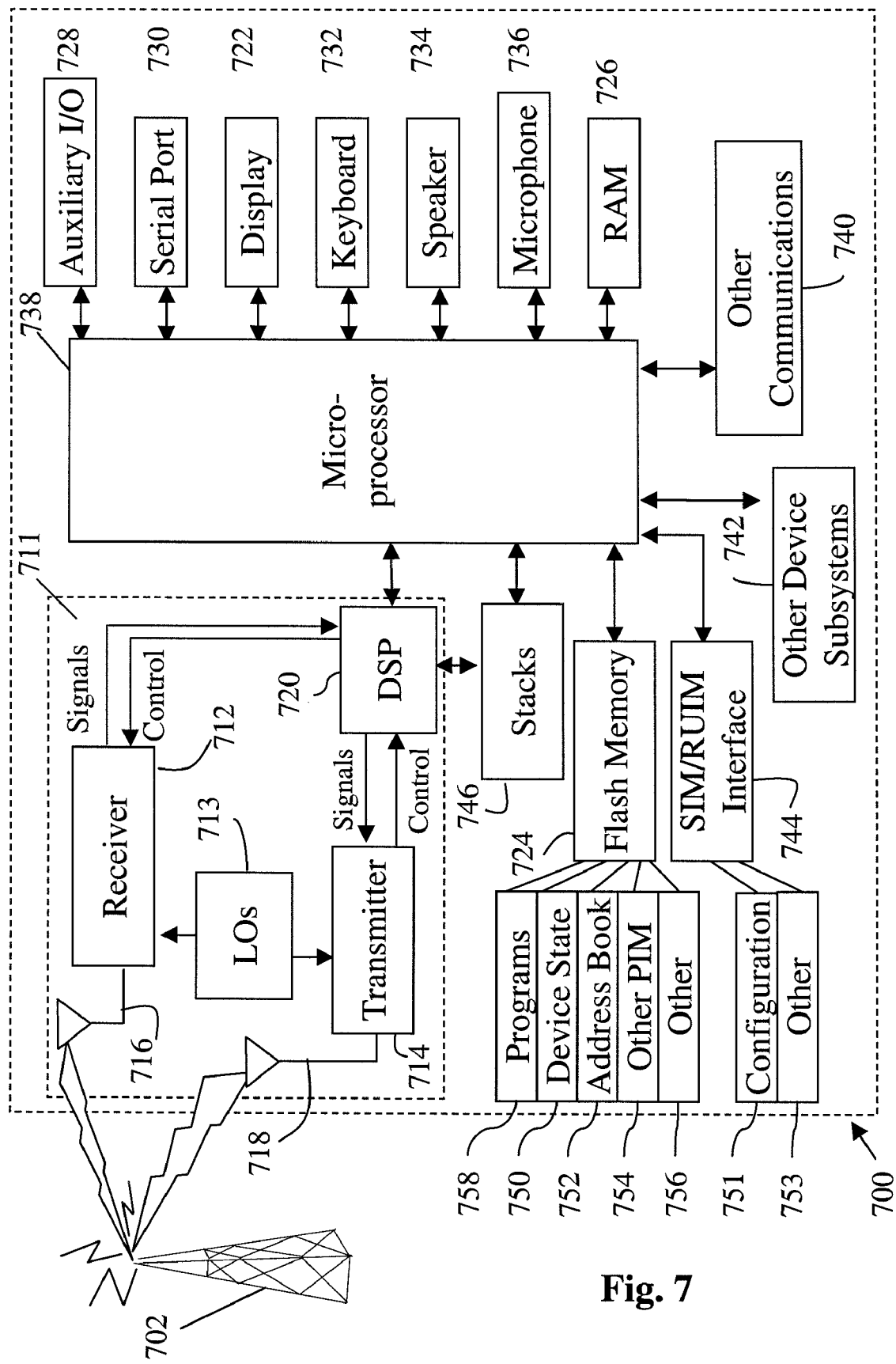
FIG. 7 is a block diagram illustrating a mobile device, which can act as a UE and co-operate with the apparatus and methods of FIGS. 1 to 6.

Turning now to FIG. 7, FIG. 7 is a block diagram illustrating a mobile device, which can act as a UE and co-operate with the apparatus and methods of FIGS. 1 to 4, and which is an exemplary wireless communication device. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, or EDGE network.

Network access requirements will also vary depending upon the type of network 702. For example, in the Mobitex and DataTAC networks, mobile station 700 is registered on the network using a unique identification number associated with each mobile station. In UMTS and GPRS networks, however, network access is associated with a subscriber or user of mobile station 700. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 700 will be unable to carry out any other functions involving communications over the network 702. The SIM interface 744 is normally similar to a card-slot into which a SIM card can be inserted and ejected like a diskette or PCMCIA card. The SIM card can have approximately 64 K of memory and hold many key configuration 751, and other information 753 such as identification, and subscriber related information.

When required network registration or activation procedures have been completed, mobile station 700 may send and receive communication signals over the network 702. Signals received by antenna 716 through communication network 702 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 702 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 702. In a preferred embodiment, the PIM data items are seamlessly integrated, synchronized and updated, via the wireless network 702, with the mobile station user's corresponding data items stored or associated with a host computer system. Further applications may also be loaded onto the mobile station 700 through the network 702, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of some of the steps may be immaterial with respect to the operation of the method. The ordering of the steps as described herein is not intended to be limiting.

It is also to be noted that where a method has been described it is intended that protection is also sought for a device arranged to carry out the method and where features have been claimed independently of each other these may be used together with other claimed features.

The invention claimed is:

1. A method for taking measurements in a user equipment device (UE), the UE configured for use in a mobile telecommunications system comprising a network of a plurality of cells, the method comprising:
   scanning one or more frequency bands to generate measurement data for signals received from cells of the network prior to cell selection, when the UE is not camped on a cell; and
   identifying from the measurement data a first cell which best meets a cell selection criterion;
   determining whether the first cell is suitable; and
   when the first cell is deemed unsuitable, re-initiating scanning of the one of more frequency bands while omitting to scan the first cell to generate measurement data for signals received from the cells other than the first cell;
   identifying form the measurement data a second cell which best meets a cell selection criteria; and
   determining whether the second cell is suitable.

2. A method according to claim 1 further comprising when the first cell is deemed unsuitable, and when the one or more frequency bands are a plurality of frequency bands, re-initiating the scanning with the omission from the scan of the frequency band in which the first cell was received by the UE.

3. A method according to claim 1 wherein the first cell is deemed unsuitable when the first cell is barred with the "intra-frequency cell-reselection indicator" set to "not allowed".

4. A method according to claim 1 further comprising determining whether the measurement data meets a predetermined criterion and storing the measurement data in an order relative to the meeting of the criterion.

5. A method according to claim 1 claim 4 further comprising:
   identifying from the stored measurement data the first cell; and
   when the first cell is deemed unsuitable, identifying from the stored measurement data a next cell, the next cell having the next strongest signal at any of the one or more frequencies and determining whether the next cell is suitable.

6. An apparatus for taking measurements in a user equipment device (UE), the UE configured for use in a mobile telecommunications system, comprising a network of a plurality of cells, the apparatus comprising:
   a micro-processor;
   memory operably connected to the micro-processor, the memory having software thereon configured to be executable by the micro-processor, and further configured such that when executed the software has the ability to:
   scan one or more frequency bands prior to cell selection, when the UE is not camped on a cell;
   generate measurement data for signals received on the frequency bands;
   identify, from the generated measurement data, a first cell which best meets a cell selection criterion;
   determine whether the first cell is suitable or unsuitable, and if the first cell is unsuitable to re-initiate a scan of the one or more frequency bands step further omitting from the scan the first cell to generate measurement data for signals received from cells other than the first cell;
   identifying from the measurement data a second cell which best meets a cell selection criteria; and
   determining whether the second cell is suitable.

7. The apparatus according to claim 6 further arranged, when the first cell is deemed unsuitable, and when the one or more frequency bands are a plurality of frequency bands, re-initiating the scanning with the omission from the scan of the frequency band in which the first cell was received by the UE.

* * * * *